E. G. McCUE.
TRAP.
APPLICATION FILED APR. 8, 1911.

1,063,715.

Patented June 3, 1913.

2 SHEETS—SHEET 1.

WITNESSES:
Samuel Payne
R. H. Butler

INVENTOR.
E. G. McCue.
BY
H. C. Evert Co.
ATTORNEYS.

E. G. McCUE.
TRAP.
APPLICATION FILED APR. 8, 1911.
1,063,715. Patented June 3, 1913.
2 SHEETS—SHEET 2.
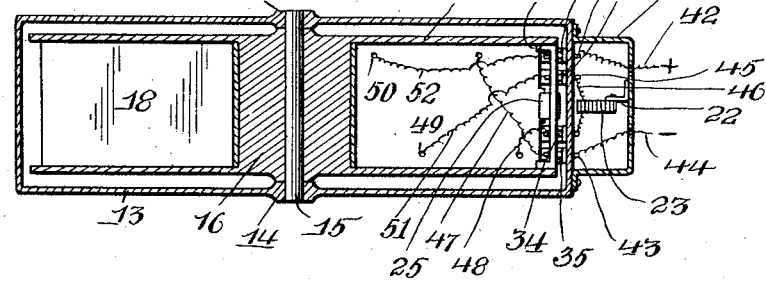
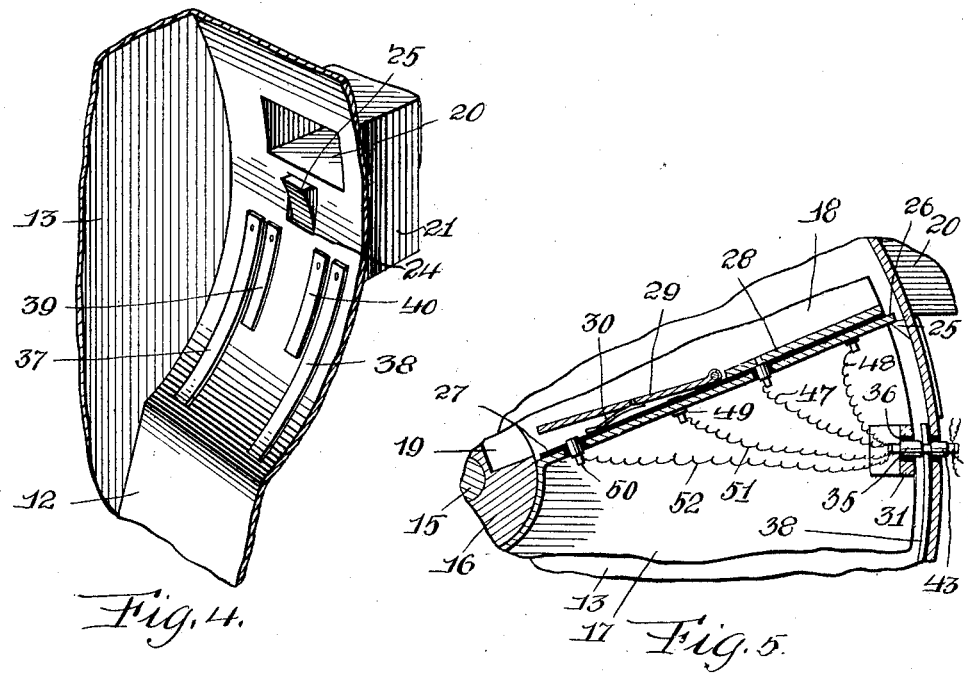
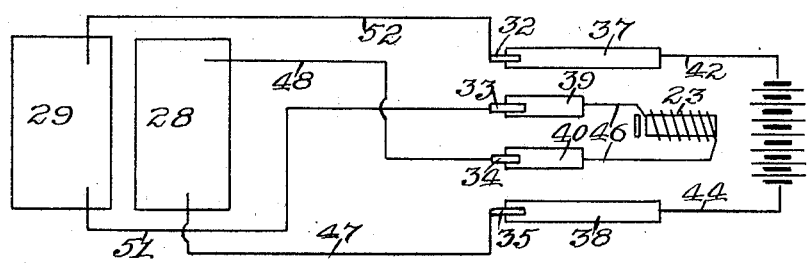
WITNESSES:
INVENTOR.
E. G. McCue.
BY
ATTORNEYS.

UNITED STATES PATENT OFFICE.

EDWARD GEORGE McCUE, OF SHARPSBURG, PENNSYLVANIA.

TRAP.

1,063,715.  Specification of Letters Patent.  Patented June 3, 1913.

Application filed April 8, 1911. Serial No. 619,764.

*To all whom it may concern:*

Be it known that I, EDWARD GEORGE McCUE, a citizen of the United States of America, residing at Sharpsburg, in the county of Allegheny and State of Pennsylvania, have invented certain new and useful Improvements in Traps, of which the following is a specification, reference being had therein to the accompanying drawing.

This invention relates to traps particularly designed for exterminating rats and other rodents by utilizing an electric current.

My invention aims to provide a trap that can be safely used for electrocuting rats entering the trap, the trap being provided with a rotary conveyer adapted to be actuated by the weight of a body of a rat to discharge the body into a suitable receptacle, which is subjected to a disinfectant or deodorant to prevent the bodies of the rats from being detected by live rats or producing an odor in a building, before the bodies of the rats are removed. To this end, I have devised an electric trap that can be advantageously used in large warehouses, other buildings and wharves, the trap being constructed whereby it can be used in connection with the ordinary electric lighting current of a building. It is designed upon lines of simplicity, durability and of such construction that it will meet with the approval of the Board of Insurance Underwriters.

The invention will be hereinafter specifically described and then claimed, and reference will now be had to the drawings, wherein like numerals of reference designate corresponding parts throughout the several views, in which:—

Figure 1:
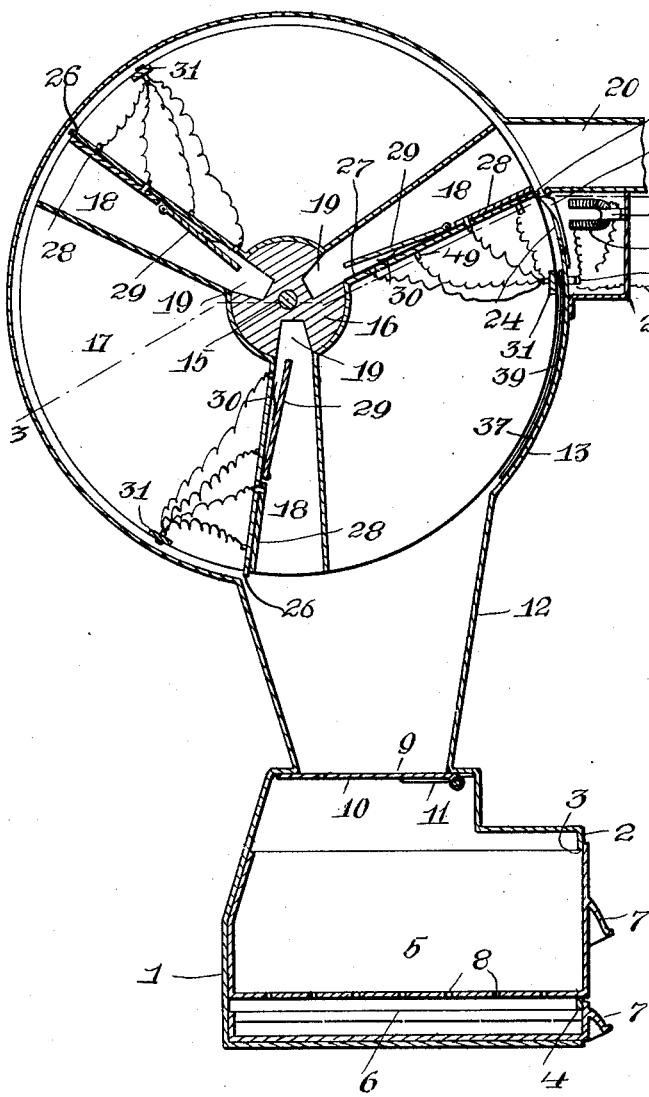
Figure 2:
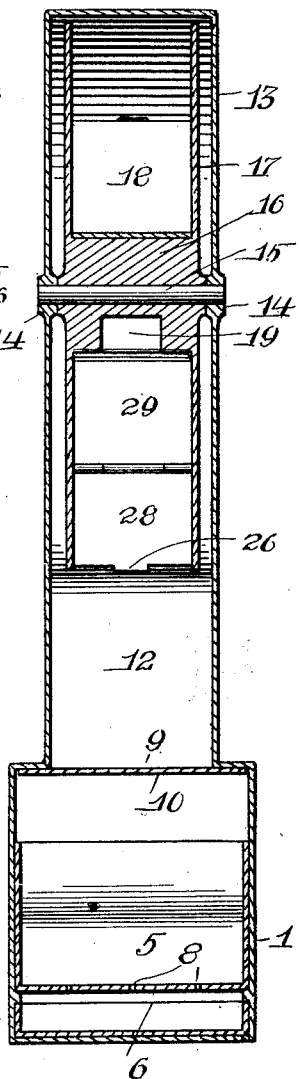

Figure 1 is a central vertical longitudinal sectional view of the trap. Fig. 2 is a vertical cross sectional view of the same. Fig. 3 is a horizontal sectional view of the trap taken on the line 3—3 of Fig. 1. Fig. 4 is a perspective view of a portion of the trap casing. Fig. 5 is an enlarged sectional view of a portion of the trap, and Fig. 6 is a diagrammatical view of the electric wiring employed in the device.

A trap in accordance with this invention comprises a housing 1 having one of the end walls 2 thereof provided with openings 3 and 4 for drawers or other detachable receptacles 5 and 6, said drawers having handles 7 whereby they can be easily removed from the housing 1. The drawer 6 is adapted to contain a disinfectant or deodorant and the fumes or gases from these detergents are adapted to pass through openings or perforations 8 in the bottom of the drawer 5. The top of the housing 1 is reduced and provided with an opening 9 and normally closing said opening is a trap door 10 adapted to swing downwardly, said trap door being hinged at one edge of the opening 9 and normally retained in a closed or horizontal position by a spring 11.

In communication with the opening 9 is a chute 12 and supported by the upper end of said chute is a cylindrical casing 13 of a width corresponding to said chute. The side walls of the casing 13 are provided with concentric apertured bosses or bearings 14, and revolubly mounted in said bosses or bearings is a shaft 15. Mounted upon the shaft 15 is a hub 16 having the ends thereof provided with large disks 17. Arranged between the disks 17 are a plurality of radially disposed pockets 18 in communication with sockets 19 in the hub 16, these sockets serving functionally as bait holders. The pockets 18 are preferably formed by sheets of metal arranged between the disks 17 and upon the hub 16. The outer ends of the pockets 18 are adapted to register with a runway or opening 20 of the casing 13 and directly beneath said runway is a casing 21. In the casing 21 are arranged a bracket 22 and a magnet 23. The casing 13 is provided with an opening 24 establishing a communication between the casings 13 and 21. Secured to the casing 13 at the lower edge of the opening 24 is a resilient catch or armature 25 adapted to engage under a projection 26 at the outer end of each of the pockets 18.

The bottom of each of the pockets 18 is provided with a plate of insulation 27 and arranged upon said plate is a contact plate 28 and a pivoted contact plate 29, said plates 28 and 29 being insulated from each other, the latter being normally maintained in an elevated position by a flat spring 30 secured to the under side of the plate 29 and engaging the plate 27. The disks 17, below each pocket, are connected by a transverse bar 31 and each bar is provided with four contacts 32, 33, 34 and 35 insulated from the bar 31, as at 36. The contacts 32 and 35 are adapted to engage contact strips 37 and 38 respectively and the contacts 33 and 34 are adapted to engage contact strips 39 and

40 respectively. The contact strips 37 and 38 are of a greater length than the contact strips 39 and 40 for a purpose that will hereinafter appear, and these strips are carried by the inner side of the casing 13, adjacent to the opening 24. The contact strip 37 is provided with a binding post 41 connected to a wire 42 from a suitable source of electrical energy. The contact strip 38 has a binding post 43 connected by a wire 44 to the same source of electrical energy. The contact strips 39 and 40 have binding posts 45 connected by wires 46 to the magnet 23. The contact plate 28 of each pocket is connected by a wire 47 to the contact 35, and by a wire 48 to the contact 34. The pivoted contact plate 29 is adapted to complete a circuit between contact blocks 49 and 50 connected by wires 51 and 52 respectively to the contacts 33 and 32.

In operation, the catch or armature 25 normally holds one of the pockets 18 in communication with the opening or runway 20, whereby a rat or other rodent can enter the pocket. As will be seen by reference to Fig. 6, there are practically two circuits provided from the source of electrical supply, both circuits being controlled by the movement of the contact plate 29 into contact with the contacts 49 and 50. While these two circuits are provided and are controlled by the position of the plate 29, the lead wires 42 and 44, contact strips 37 and 38, contacts 32 and 35, and lead wires 47 and 52 are common in both circuits, as will be clear from the following:—When the parts are in the position shown in Fig. 1, with the plate 29 raised, the entire connection with the source of electrical supply is broken and neither circuit is in operation. The entrance of a rat into the pocket in attempting to reach the bait, causes the plate 29 to be depressed, thus bringing said plate into circuit with the source of electrical energy, this closing of the circuit energizing the magnet 23 through the wire 42, contact strip 37, contact 32, wire 52, plate 29, wire 51, contact 33, contact strip 39 to the magnet 23 and returning through contact strip 40, contact 34, wire 48, plate 28, wire 47, contact 35, contact strip 38 and wire 44, thus providing a metallic circuit which acts to energize the magnet and withdraw the trip provided by the armature, releasing the rotatable conveyer and permitting the weight of the rat to turn the conveyer. This circuit forms the tripping circuit and remains active as long as the contacts 33 and 34 are in contact with the contact strips 39 and 40 (it being understood that plate 29 remains depressed). Inasmuch as the contact strips 39 and 40 are of less length than the strips 37 and 38, it will be readily understood that the rotation of the conveyer will break this tripping circuit by carrying the contacts 33 and 34 out of contact with their respective strips without, however, affecting the connections between the plates 28 and 29 and the source of electric energy, the contacts 32 and 35 still being in contact with their respective strips. As a result, that portion of the tripping circuit between the plates 28 and 29 and the magnet 23 becomes inactive, leaving the plates 28 and 29 to operate as the terminals of an electrocuting circuit, these terminals being bridged by the rat. From the above, it will be understood that the tripping circuit, being metallic and offering less resistance than the rat, will practically short circuit the electrocuting circuit as long as the contacts 33 and 34 are in contact with their respective strips, holding the electrocuting circuit inactive until the conveyer has moved a distance corresponding to the length of the strips 39 and 40, and this distance practically closes the inlet end of the pocket, so that the electrocution takes place in a closed portion of the apparatus and while the conveyer is moving. There is a particular advantage in this arrangement, in that there is a certainty that the apparatus will be tripped, since the rat is not affected by the current until after such tripping operation is completed, hence the movements of the rat within the pocket when the conveyer begins its movement will not have the effect of positioning the rat at a point where he would not bridge the terminals, the frightening of the rat tending to provide with greater certainty the movements which would bridge the terminals. Furthermore, it is not necessary that this bridging take place for the purpose of tripping the apparatus, the tripping circuit being completed by the depressing of the plate 29 regardless of any contact of the rat with plate 28. When the tripping circuit is broken by the movement of the conveyer, the armature is released thereby permitting the catch 25 to resume its normal position and stop the rotation of the conveyer. As the rat's body slides from the pocket into the chute 12, the pivoted contact plate 29 is restored to its normal position and the trap is in condition to catch another rat. When the rat's body encounters the trap door 10, said door is opened to deposit the body in the drawer or receptacle 5, the trap door immediately closing to prevent, as nearly as possible, any odors from passing upwardly through the chute 12.

From the foregoing it will be observed that I have devised a trap for catching and exterminating rats as fast as they enter the same, the rat bodies being removed in a sanitary manner whereby other rodents cannot detect the presence of the bodies, also rendering it unnecessary for the bodies to be touched by hand. The electric circuits are automatically cut in and cut out, consequently the current is not used except during the extermination of a rodent.

The trap in its entirety can be made of light and durable material, suitable insulations used, and the trap installed whereby a rat or other rodent can easily enter the opening or runway 20.

While in the drawings there is illustrated a preferred embodiment of the invention, it is to be understood that the structural elements thereof are susceptible to such changes as fall within the scope of the appended claims.

What I claim is:—

1. In an electric trap, a rotatable conveyer having a pocket, a stationary runway, a stop for normally positioning the conveyer with the pocket in substantial alinement with the runway, a source of electrical energy, a shiftable and a stationary plate carried by said pocket, one of said plates connected to one side of said source, means adapted to be engaged by said shiftable plate when the latter is shifted whereby said shiftable plate is electrically connected to the other side of said source and in connection with said stationary plate forming an electrocuting circuit, means for shifting said stop to release said conveyer, electrical connections connected with said means and adapted to be electrically connected with said plates for forming a circuit to actuate said means to release the stop, and means for making the duration of activity of the circuit for operating the means to release the stop less than the length of activity of the electrocuting circuit.

2. In an electric trap, a rotatable conveyer having a pocket, a stationary runway, a stop for normally positioning the conveyer with the pocket in substantial alinement with the runway, a source of electrical energy, a shiftable and a stationary plate carried by said pocket, one of said plates connected to one side of said source, means adapted to be engaged by said shiftable plate when the latter is shifted whereby said shiftable plate is electrically connected to the other side of said source and in connection with said stationary plate forming an electrocuting circuit, means for shifting said stop to release said conveyer, electrical connections connected with said means and adapted to be electrically connected with said plate for forming a circuit to actuate said means to release the stop, means for making the duration of activity of the circuit for operating the means to release the stop less than the length of activity of the electrocuting circuit, and means whereby that circuit to actuate the means to release the stop will act to short circuit the electrocuting circuit during the period of activity of the tripping circuit.

In testimony whereof I affix my signature in the presence of two witnesses.

EDWARD GEORGE McCUE.

Witnesses:
 Max H. Srolovitz,
 Christina T. Hood.

---

Copies of this patent may be obtained for five cents each, by addressing the "Commissioner of Patents, Washington, D. C."